March 10, 1942.    T. G. CLEMENT    2,275,734
PHOTOGRAPHIC DARKROOM LAMP
Filed Oct. 17, 1939
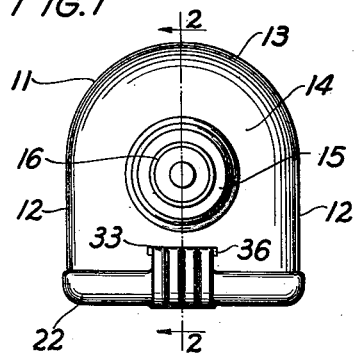
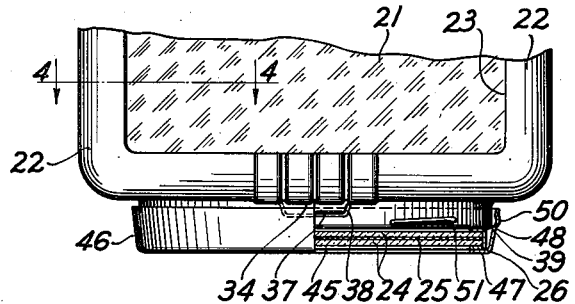
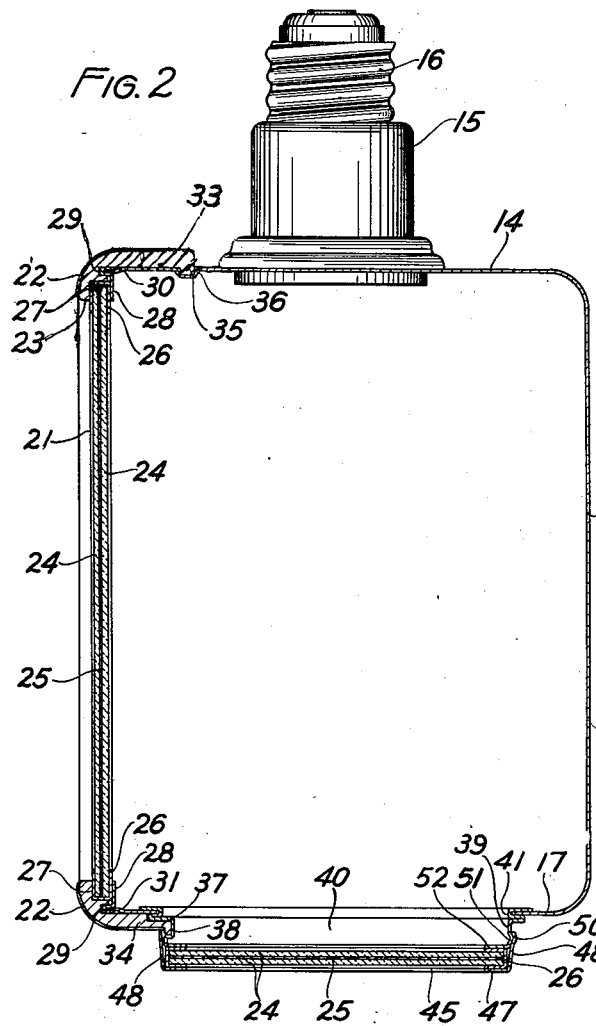
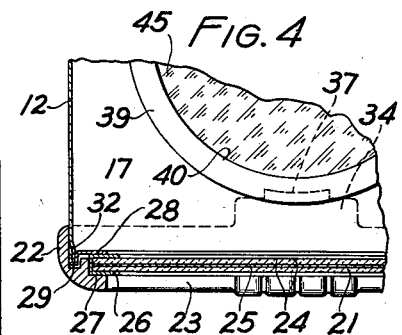
THEODORE G. CLEMENT
INVENTOR
BY *J. Griffin Little*
ATTORNEYS Patented Mar. 10, 1942

2,275,734

UNITED STATES PATENT OFFICE 2,275,734

PHOTOGRAPHIC DARKROOM LAMP

Theodore G. Clement, Rochester, N. Y., assignor to Eastman Kodak Company, Rochester, N. Y., a corporation of New Jersey Application October 17, 1939, Serial No. 299,863

6 Claims. (Cl. 240—20)

The present invention relates to lamps, and more particularly to portable lamps intended for use in photographic darkrooms.

One object of the invention is the provision of a lamp of this class which comprises few parts which may be readily and easily assembled, and when so assembled are securely retained in their respective positions, yet may be readily taken apart when so desired.

A further object of the invention is the provision of a novel arrangement for detachably securing the light filtering windows on the lamp casing.

A still further object of the invention is the provision of an arrangement by which the attaching of one of the filter windows to the lamp casing serves to also lock the other filter window thereto.

Another object of the invention is the provision of a simple yet highly effective arrangement for retaining the windows in light filtering position, yet permitting ready removal of the windows for assembling of the proper filtering members.

To these and other ends, the invention resides in certain improvements and combinations of parts all as will be hereinafter more fully described, the novel features being pointed out in the claims at the end of the specification.

In the drawing:

Fig. 1 is a top view of a photographic darkroom lamp constructed in accordance with the present invention;

Fig. 2 is a vertical sectional view through the lamp illustrated in Fig. 1 and taken substantially on the line 2—2 thereof, showing the arrangement of the lamp parts and the means for locking the front filter window in position;

Fig. 3 is a detailed view of the lower portion of the lamp showing the arrangement for detachably securing the bottom filter window to the lamp casing;

Fig. 4 is a horizontal sectional view taken substantially on line 4—4 of Fig. 3, showing the relation of a two filter window frames; and Fig. 5 is a perspective view of the circular window frame adapted to be detachably secured to the bottom of the lamp casing.

Similar reference numerals throughout the various views indicate the same parts.

The present invention is embodied in a portable photographic darkroom lamp which comprises a body portion which is made of metal or other suitable non-actinic material. This body portion is provided with a pair of openings adapted to be covered with suitable filtering windows. Each of these windows comprise a frame member arranged around the edge of an opening in the body portion and cooperating therewith to form a light lock around the periphery of the window. Each window also carries a suitable light filter which, in the present instance, comprises two clear glass strips with one surface of one glass gel coated with a suitable dye to give the proper spectral cut. A paper of suitable color is positioned between the glass strips to properly diffuse the light. The windows are detachably secured to the casing so that they may be readily and easily removed to replace or change the filtering members carried thereby. In addition, one of the windows is so designed that, when secured in position on the lamp casing it also affords a lock for securely retaining the other window in place.

As shown in the drawing, the lamp comprises, in general, a body portion of casing 11 formed of any suitable non-actinic material such as for example, sheet metal, which is bent into a U-shape to provide a pair of side walls 12 and a curved back wall 13 which connects the side walls and also serves as a reflector for the light source positioned within the lamp. The lamp casing is also provided with a top 14 to which is fastened an electric socket 15 having a threaded portion 16 arranged to be engaged in an ordinary service outlet of a house lighting system. The interior of the socket 15 is also threaded to receive the socket of an electric lamp, not shown, which is arranged to be positioned within the lamp casing 11 to provide a source of illumination for the lamp. The socket 15 is, of course, suitably insulated from the top 14. The lamp is also provided with a bottom 17 which is suitably secured to the lower end of the sides and back 12 and 13 respectively. The lamp so far described is of well-known construction and closely resembles that shown and described in the patent to Barnes, et al., Number 1,252,383, issued January 8, 1918.

The sides 12, top 14, and bottom 17, cooperate to provide a rectangular shaped front opening which is adapted to be covered by a similarly shaped filter window, generally indicated by the numeral 21. This window comprises a hollow rectangular frame 22 formed with a central opening 23 arranged to be covered with a suitable light filtering member which in the present embodiment comprises a pair of clear glass plates 24 between which a suitably colored light diffusing paper 25 is positioned. As pointed out above, one surface of one of these glass plates is gel coated with a suitable dye to provide the proper spectral cut. The glass plates 24 and the paper 25 are held in assembled relation by means of a securing frame 26 which extends around the periphery of the glass plates, as best shown in Fig. 2. These filtering members are held in place between a shoulder 27 formed on the frame 22 and a hollow rectangular metal strip 28 positioned within the frame 22. The shoulder 27 and strip 28 thus cooperate to retain the filtering members in position. However, when the frame member 22 is detached from the casing 11, the strip 28 may be lifted out to permit removal or replacing the filtering members. When, on the other hand, the frame 22 is in operative position, as shown in Fig. 2, a marginal U-shaped portion 29 of the strip 28 is arranged to receive the edges 30 and 31 of the top 14 and bottom 17 respectively and also the edges 32 of the sides 12 to hold the strip 28 in clamping engagement with the filtering member, as is apparent from an inspection of Fig. 2. The edges 30, 31, and 32 also cooperate with the U-shaped portion 29 to provide an effective light lock around the periphery of the frame 22.

As different sensitized materials require different safe-lights, the filtering window 21 with its filtering members is preferably detachably mounted on the casing 11 so that it may be readily separated therefrom to permit the assembly of the proper filtering members in the window frame 22, the advantage of which will be readily apparent to those in the art. To this end, the frame 22 has secured thereto or formed integral therewith a pair of lugs 33 and 34 extending substantially at right angles to the frame 22, as best shown in Fig. 2. The upper lug 33 has the free end thereof bent to provide a portion 35 adapted to extend into a recess or embossing 36 formed in the top 14, see Fig. 2. The lower lug 34 also has the free end thereof bent down to provide a portion 37 arranged to be positioned in a recess or slot 38 formed in an annular flange 39 which surrounds and extends from the edges of a circular opening 40 formed in the bottom 17. The flange 39 may be formed from the material of the bottom 17; but, in the present embodiment, it is formed from a separate piece of sheet material, preferably sheet metal, which is crimped or clamped to the bottom 17 around the edges of the opening 40, as shown at 41, Fig. 2.

It is apparent from an inspection of Fig. 2, that by closing the slot 38 the portion 37 will be retained therein and the front filtering window 21 will be locked in position on the lamp casing. However, when the slot is open, the portion 37 may be withdrawn therefrom and the window 21 may be readily and easily removed from the casing 11, as is apparent. To secure such removal, the window 21 is pivoted in a clockwise direction about the upper portion 35 until the portion 37 has cleared the lamp casing, after which the portion 35 may be lifted out of the embossing 36 to completely detach the window 21 from lamp casing.

This locking means for the front filter window 21 comprises, in the present embodiment, a lower filter window 45 adapted to cover the lower circular opening 40 and to cooperate with the front window 21 to provide a suitable safelight for the darkroom. The window 45 comprises a frame 46 formed to provide an annular portion 47 adapted to support the filtering member. As these members are of the same construction as those used in the front window 21 the corresponding parts are therefore designated by the same numerals, the shape of the filtering members being of course such as to conform to the shape of the respective windows, for obvious reasons. The marginal edge of the portion 47 is bent upwardly to form an annular rim 48 which is arranged to overlie the outer surface of the flange 39, as best shown in Fig. 2. This rim is formed with a plurality of spaced nibs or embossing 50 which cooperate with the inclined ridges 51 on the flange 39 to provide, in effect, a threaded connection or bayonet lock between the flange 39 and the rim 48 so that when the latter is given a slight rotative motion in one direction, the rim 48 is secured to the flange 39, as will be readily apparent from an inspection of the drawing. When the frame 45 is thus secured to the flange 39, the filtering members are clamped in position between the annular portion 47 and an inwardly turned annular ring 52 formed on the lower end of the flange 39, see Fig. 2.

This construction thus not only retains the lower window members in proper assembled relation, but also affords a light lock between the window 45 and the depending flange 39. In the event that the filtering members are to be replaced, the window frame 46 is given a slight rotative motion in the opposite direction to disconnect the window 45 from the flange 39. The filter members may now be replaced. Thus, the window 45 is detachably secured to the casing 11 and may be readily and easily secured thereto or detached therefrom.

The annular rim 48 is utilized to not only secure the bottom window 45 to the lamp casing, but to also close the recess 38 to lock the front window 21 to the lamp casing. To secure this result, the rim 48 has a recess or notch 53 formed in the upper edge thereof, see Fig. 5. When the window 45 is placed in position on the flange 39, the notch 53 registers with the slot 38 so that the portion 37 may be withdrawn. When, however, the rim 49 is given a slight rotative motion to secure it to the flange 39, as above described, the notch 53 is moved out of registry with the slot 38 and the latter is now closed by the rim 48 to retain or lock the portion 37 in the slot 38 and to thus lock the front window in position on the lamp casing. Thus the turning of the bottom window member not only detachably secures the latter to the lamp casing, but also locks the front window 21 in position thereon. Upon rotation of the window 45 in the opposite direction, the rim 49 is turned relative to the flange 39 to disengage the nibs 59 from the ridges 51. At this time, the notch 53 again registers with and uncovers the slot 38 to permit withdrawal of the portion 37 therefrom. Both the windows 21 and 45 may now be removed from the lamp casing 11.

It is apparent from the above description that the present invention provides a portable darkroom lamp of simple yet rugged construction, and formed of few parts which may be easily and quickly assembled and when so assembled are securely retained in their respective positions, yet may be easily taken apart when so desired. It is also apparent that the securing of the bottom filter window to the lamp casing also serves to effectively lock the front filter window in position. The various windows are detachably secured to the lamp casing so that they may be quickly removed therefrom for assembling of the proper filtering members.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic darkroom lamp comprising a casing in which a light source is positioned, said casing having a pair of openings formed in the walls thereof, frame members surrounding said openings and provided with suitable light filters adapted to close said openings, means for detachably securing said frame members in position on said casing, a portion formed from the material of one of the frame members and directly engaging a portion of the other frame member to lock the latter in position on the casing.

2. A photographic darkroom lamp comprising a casing in which a light source is positioned, said casing having a pair of openings formed in the walls thereof, detachable frame members surrounding said openings and provided with suitable light filters adapted to close said openings, an annular member formed on said casing around one of said openings, an annular flange on one of said frame members adapted to overlie said annular member, cooperating means on said member and said flange for detachably securing said one frame member in position on said casing, and means on said flange adapted to engage a portion of the other frame member to lock the latter on said casing.

3. A photographic darkroom lamp comprising a casing in which a light source is positioned, said casing having openings formed in the front and bottom walls thereof, filter windows covering said openings, means for detachably securing one of said windows on said casing, cooperating members on said casing and the other of said windows for detachably securing said other window on said casing, and means on one of said members for locking said one window in position.

4. A photographic darkroom lamp comprising a casing in which a light source is positioned, said casing having openings formed in walls thereof, filter windows adapted to cover said openings, said casing being formed with recesses, a pair of lugs on one of said windows arranged to extend into said recesses to detachably secure one of said windows to said casing, means for detachably securing the other of said windows to said casing, and means on said last mentioned securing means for closing one of said recesses for locking said one window in position.

5. A photographic darkroom lamp comprising a casing in which a light source is positioned, said casing having openings formed in separate walls thereof, an annular flange surrounding one of said openings, filter windows adapted to cover said openings, a pair of lugs on the opposite ends of one of said windows, said casing and said flange being formed with recesses adapted to receive portions of said lugs to detachably secure said one window to said casing, an annular rim on said other window arranged to overlie said flange and to be positioned to close the recess therein to lock said one window to said casing, and cooperating members on said rim and said flange for detachably securing said other window to said casing.

6. A photographic darkroom lamp comprising a casing in which a light source is positioned and formed to provide a top, bottom and front walls, said front wall being formed with a rectangular opening, said bottom wall having a circular opening therein, an annular flange surrounding said circular opening, a rectangular filter window arranged to cover said front opening, lugs on said rectangular window arranged to extend into recesses formed on said top wall and said flange to detachably secure said rectangular window on said casing, a circular filter window for closing said circular opening, an annular rim on said circular window adapted to overlie said flange, cooperating members on said flange and rim for detachably securing said circular windows over said circular opening, and means on said rim adapted to engage one of said lugs to retain said one lug in its recess to lock said rectangular window in position.

THEODORE G. CLEMENT.